(12) United States Patent
Sánchez-Caja

(10) Patent No.: US 11,479,330 B2
(45) Date of Patent: Oct. 25, 2022

(54) ENERGY TRANSFORMING DEVICE AND METHOD OF TRANSFORMING ENERGY

(71) Applicant: Teknologian tutkimuskeskus VTT Oy, Espoo (FI)

(72) Inventor: Antonio Sánchez-Caja, VTT (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 335 days.

(21) Appl. No.: 16/342,553

(22) PCT Filed: Oct. 17, 2017

(86) PCT No.: PCT/FI2017/050724
§ 371 (c)(1),
(2) Date: Apr. 17, 2019

(87) PCT Pub. No.: WO2018/073493
PCT Pub. Date: Apr. 26, 2018

(65) Prior Publication Data
US 2020/0055581 A1    Feb. 20, 2020

(30) Foreign Application Priority Data
Oct. 17, 2016 (FI) ...................................... 20165789

(51) Int. Cl.
*B63H 1/34* (2006.01)
*B63J 99/00* (2009.01)
*B63B 79/00* (2020.01)

(52) U.S. Cl.
CPC ............... *B63H 1/34* (2013.01); *B63J 99/00* (2013.01); *B63B 79/00* (2020.01); *B63H 2001/348* (2013.01)

(58) Field of Classification Search
CPC ........ B63H 2001/342; B63H 2001/344; B63H 2001/346; B63H 2001/348; B63B 79/00; F03D 5/02; B63J 99/00
See application file for complete search history.

(56) References Cited

U.S. PATENT DOCUMENTS 5,401,196 A    3/1995 Triantafyllou et al.
6,072,245 A *  6/2000 Ockels ..................... F03D 5/02
                                                    290/55
(Continued)

FOREIGN PATENT DOCUMENTS

DE    3640285 A1    6/1988
DE    4238394 A1    5/1994
(Continued)

OTHER PUBLICATIONS

Rosado, Tina. "How Hydrofoils work" https://web.mit.edu/2.972/www/reports/hydrofoil/hydrofoil.html, retrieved May 12, 2021 (Year: 1999).*

*Primary Examiner* — Andrew Polay
(74) *Attorney, Agent, or Firm* — Laine IP Oy

(57) ABSTRACT

According to an example aspect of the present invention, there is provided a marine propulsion system (1) comprising a first portion (4) and a second portion (5) of a set of movable foils, a movement mechanism (2) coupled to the first portion (4) and the second portion (5) of the set of movable foils and configured to simultaneously control a motion of the first portion (4) and the second portion (5) of the set of foils along a closed first trajectory (6) comprising a first direction (17) and a second direction (18) which is different than the first direction (17), and a pitch mechanism (3) coupled to the first portion (4) and the second portion (5) of the set of movable foils and configured to control a pitch angle ($\pi$) of the first portion (4) and the second portion (5) of the set of movable foils, and wherein the pitch angle ($\pi$)

(Continued)

of at least a part of the second portion (5) of the set of foils is dependent on an incoming fluid flow ($v_x$), the motion of the second portion (5) of the set of foils, and a flow ($v_{ind}$) induced by at least a part of the first portion (4) of the set of foils.

15 Claims, 6 Drawing Sheets

(56) References Cited

U.S. PATENT DOCUMENTS

| | | |
|---|---|---|
| 6,435,827 B1 | 8/2002 | Steiner |
| 2011/0309634 A1 | 12/2011 | Syrovy |
| 2014/0212286 A1 | 7/2014 | Borgesen |
| 2015/0321740 A1* | 11/2015 | Bradley .................. B63H 1/10 |
| | | 416/1 |
| 2016/0362179 A1* | 12/2016 | Vetter ..................... B64C 37/00 |

FOREIGN PATENT DOCUMENTS

| | | | |
|---|---|---|---|
| FR | 2697225 A1 | 4/1994 | |
| JP | 2001280230 A | 10/2001 | |
| JP | 2013083223 A * | 5/2013 | ............ B63B 35/44 |
| WO | WO2005047100 A1 | 5/2005 | |
| WO | WO2006028454 A2 | 3/2006 | |
| WO | WO2011115475 A2 | 9/2011 | |
| WO | WO2013014232 A1 | 1/2013 | |
| WO | WO2013188285 A1 | 12/2013 | |
| WO | WO2016126166 A1 | 8/2016 | |

* cited by examiner

ENERGY TRANSFORMING DEVICE AND METHOD OF TRANSFORMING ENERGY

FIELD

The present invention relates to an energy transforming device. Further, the present invention relates to a method of transforming energy. Furthermore, the present invention relates to a computer readable medium. Additionally, the present invention relates to a computer program.

Aspects of the present invention relate to a marine propulsion system. Other aspects of the present invention relate to a system for harvesting energy.

BACKGROUND

Many different energy transforming devices for use in a fluid are known. Some energy transforming devices are used to propel a vessel and others are used to harvest energy from an incoming fluid flow.

Known energy transforming systems which act as propulsion systems are e.g. oscillating foil propulsion systems and cycloidal propellers. The oscillating foil propulsion systems require especial mechanisms of heave and pitch motion control and result in non-desirable unsteady loads, the magnitude of which fluctuates between a maximum negative and a maximum positive value. Applications of this type are still rare. Document WO 2011/115475 A2 for example discloses a method and apparatus for oscillating a single foil in a fluid. The method comprises the steps of generating an oscillating heave motion of the foil in the fluid, the oscillating cycle of the heave motion consisting of two strokes of the foil in opposite direction, and generating an oscillating pitching motion of the foil in the fluid, wherein the heave motion is controlled and the pitching motion is adjusted during the oscillating cycle of the heave motion. Also document U.S. Pat. No. 5,401,196 discloses a propulsion system for use in a fluid, the system utilizing at least one foil which is both oscillated at a frequency f with an amplitude a in a direction substantially transverse to the propulsion direction and flapped or pitched about a pivot point to change the foil pitch angle to the selected direction of motion with a smooth periodic motion. Parameters of the system including Strouhal number, angle of attack, ratio of the distance to the foil pivot point from the leading edge of the foil to the chord length, the ratio of the amplitude of oscillation to the foil chord width and the phase angle between heave and pitch are all selected so as to optimize the drive efficiency of the foil system.

The cycloidal propellers have in addition extra losses in axial direction due to the axial component of the rotational motion. They have been implemented widely only for the prolate cycloidal foil trajectories that are characterized by low efficiency and high directionality of thrust. Applications on trochoidal trajectories are supposed to be of high efficiency but practical implementations are still missing. Document US 2015/0321740 A1 for example discloses a cycloidal marine propulsion system. The system comprises a blade-mounting disc and a plurality of propeller blades. Each of the plurality of propeller blades has a respective primary blade axis and is connected to the disc in a manner allowing the blade to be rotated about its primary blade axis independent of any about-axis rotation of every other one of the propeller blades.

Other forms of marine propulsion are for example paddle propulsion systems. Document DE 4238394 A1 for example discloses a system including circulating paddles which are held on a block chain. The paddles move in a tangential circuit about two pinions. The paddles are always in a vertical position due to controlled guidance. This may be carried out by one or two further block chains, link guides, or a combination of the two. Document FR 2697225 A1 describes another paddle propulsion system, wherein the blades are mounted onto the links of a pair of chains which run on pairs of toothed wheels. Document DE 3640285 A also teaches a paddle propulsion system comprising two endless belts fitted with blades projecting at right angles.

Of course, the main practical solutions to the propulsion problem existing nowadays are conventional propellers that, due to the relative small active area covered by the propeller blades, usually work in a high loaded condition.

In addition to propulsion systems, certain other energy transforming systems comprising foils are known which act as a turbine. Such energy transforming devices transfer the kinetic energy of an incoming fluid flow to generators in order to harvest energy.

In view of the foregoing, it would be beneficial to provide an energy transforming device such as a propulsion device or a device for harvesting energy, which improves aspects relating to at least one of efficiency, cavitation, and reduction of unsteady loads. The device should be capable of being manufactured in industrial scale.

SUMMARY OF THE INVENTION

The invention is defined by the features of the independent claims. Some specific embodiments are defined in the dependent claims.

According to a first aspect of the present invention, there is provided energy transforming device comprising a first portion and a second portion of a set of movable foils, a movement mechanism coupled to the first portion and the second portion of the set of movable foils and configured to simultaneously control a motion of the first portion and the second portion of the set of foils along a closed trajectory comprising a first direction and a second direction which is different than the first direction, and a pitch mechanism coupled to the first portion and the second portion of the set of movable foils and configured to control a pitch angle of the first portion and the second portion of the set of movable foils.

Various embodiments of the first aspect may comprise at least one feature from the following bulleted list:
- the pitch angle of at least a part of the second portion of the set of foils is dependent on an incoming fluid flow, the motion of the second portion of the set of foils, and a flow induced by at least a part of the first portion of the set of foils
- the pitch mechanism is configured to simultaneously or independently control the pitch angle of the first portion and the second portion of the set of movable foils
- the pitch mechanism is configured to independently control the pitch angle of each of the foils of the set of movable foils
- the movement mechanism is configured to control a velocity of the motion of the first portion and the second portion of the set of movable foils
- the device is configured to perform the motion of the first portion of the set of foils in another plane than the motion of the second portion of the set of foils
- the first direction of the first portion of the set of foils is opposite to the second direction of the second portion of the set of foils the motion of at least a part of the first portion and/or the second portion of the set of foils is along a straight line or an elongated curve, wherein a length of a transverse part of the curve is less than 10% of a length of a longitudinal part of the curve, preferably less than 5%, and even more preferably less than 2% the movement mechanism comprises a first conveyor capable of moving along the first trajectory the first conveyor is coupled to the foils at a distance in the range between 0%-35% of the chord length of the respective foil from a leading edge of the foil the pitch mechanism comprises a second conveyor capable of moving along a closed second trajectory the device, in particular the pitch mechanism, comprises a fore pitch control configured to adjust the pitch angle of the first portion of the set of foils and an aft pitch control configured to adjust the pitch angle of the second portion of the set of foils the device is configured to be arranged in a fluid flow such that the first direction and the second direction are orientated perpendicular to an incoming axial fluid flow the device includes at least one sensor for measuring at least one of a local fluid flow velocity and a local fluid flow direction the device is a propulsor the device is configured to steer a vessel the device is configured to harvest energy from an incoming fluid flow, preferably a liquid flow, and especially a water flow at least one of the foils of the set of movable foils is at least partially flexible According to a second aspect of the present invention, there is provided a method of transforming energy comprising simultaneously guiding a first portion and a second portion of a set of movable foils along a closed first trajectory comprising a first direction and a second direction which is different than the first direction, adjusting a pitch angle of the first portion and the second portion of the set of movable foils by a pitch mechanism, and creating thrust by means of driving the foils along the first trajectory utilizing a movement mechanism or transferring kinetic energy from an incoming fluid flow to a generator by means of guiding the foils along the first trajectory utilizing the movement mechanism.

Various embodiments of the second aspect may comprise at least one feature from the following bulleted list:

the pitch angle of at least a part of the second portion of the set of foils is controlled dependent on an incoming fluid flow, the motion of the second portion of the set of foils, and a flow induced by at least a part of the first portion of the set of foils the pitch angle of the first portion and the second portion of the set of movable foils is controlled simultaneously or independently the pitch angle of each of the foils of the set of movable foils is controlled independently a velocity of the motion of the first portion and the second portion of the set of movable foils is controlled the motion of the first portion of the set of foils is performed in another plane than the motion of the second portion of the set of foils the first direction of the first portion of the set of foils is opposite to the second direction of the second portion of the set of foils at least a part of the first portion and/or the second portion of the set of foils is moved along a straight line or along an elongated curve, wherein a length of a transverse part of the curve is less than 10% of a length of a longitudinal part of the curve, preferably less than 5%, and even more preferably less than 2% energy is transferred in order to propel a vessel energy is transferred in order to steer a vessel energy is transferred in order to harvest energy from an incoming fluid flow According to a third aspect of the present invention, there is provided a computer readable medium having stored thereon a set of computer implementable instructions capable of causing a computing device, in connection with a first portion and a second portion of a set of movable foils, a movement mechanism coupled to the first portion and the second portion of the set of movable foils and configured to simultaneously control a motion of the first portion and the second portion of the set of foils along a closed first trajectory comprising a first direction and a second direction which is different than the first direction, a pitch mechanism coupled to the first portion and the second portion of the set of movable foils and configured to control a pitch motion of the first portion and the second portion of the set of movable foils, to create thrust by means of driving the foils along the first trajectory utilizing the movement mechanism or transfer kinetic energy from an incoming fluid flow to a generator by means of guiding the foils along the first trajectory utilizing the movement mechanism.

According to a certain embodiment, the pitch angle of at least a part of the second portion of the set of foils is controlled dependent on the incoming fluid flow, the motion of the second portion of the set of foils, and a flow induced by at least a part of the first portion of the set of foils.

According to a fourth aspect of the present invention, there is provided a computer program configured to cause a method in accordance with the second aspect of the present invention to be performed.

Considerable advantages are obtained by certain embodiments of the invention. Certain embodiments of the invention provide an energy transforming device configured to propel a vessel. Certain other embodiments of the invention provide an energy transforming device configured to harvest energy from an incoming fluid flow.

Advantages of the invention are related to aspects regarding high efficiency, low cavitation, reduction of unsteady loads, foils working at optimum conditions at any incoming local fluid velocity and direction by adjusting the fore and aft foil pitch. Certain embodiments of the present invention also allow to maneuver a vessel without rudders.

For a particular study case the hydrodynamic efficiency grows above 15% over conventional ship propellers and 6% over theoretical figures of oscillating foils. In comparison to the concept of oscillating propulsion systems, the foils of certain embodiments of the present invention work most of the time in a type of steady-state motion, which is beneficial from the view point of vibratory forces and efficiency.

According to certain embodiments of the present invention, at least one of the foils of the set of movable foils is at least partially flexible in order to further improve efficiency.

EMBODIMENTS

Figure 1:
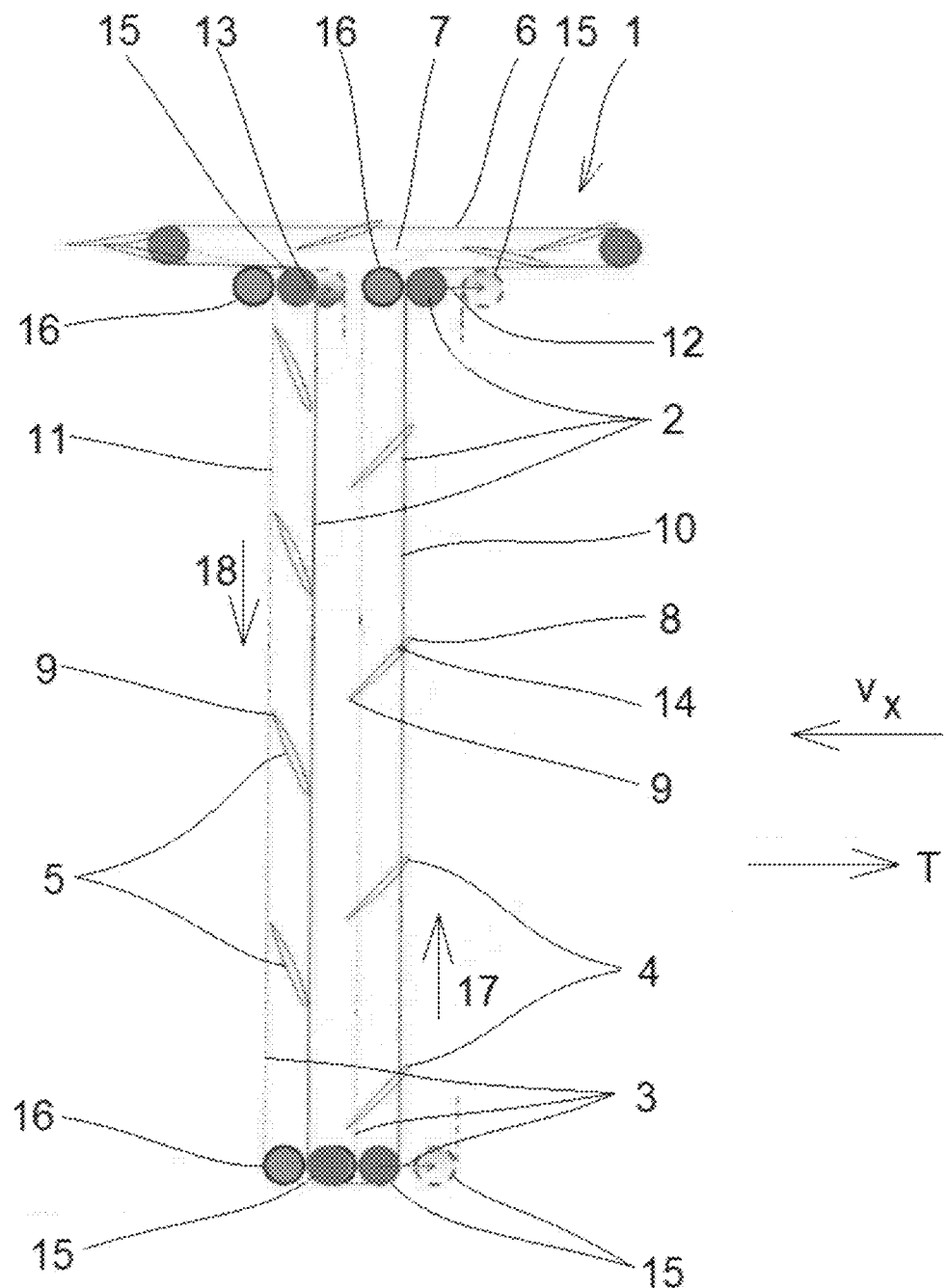
FIG. 1 illustrates a schematic view of an energy transforming device configured to propel a vessel in accordance with at least some embodiments of the present invention.

In FIG. 1 a schematic view of an energy transforming device 1 configured to propel a vessel in accordance with at least some embodiments of the present invention is illustrated. The marine propulsion system comprises a first portion 4 and a second portion 5 of a set of movable foils, a movement mechanism 2 coupled to the first portion 4 and the second portion 5 of the set of movable foils and configured to simultaneously control a motion of the first portion 4 and the second portion 5 of the set of foils along a closed first trajectory 6 comprising a first direction 17 and a second direction 18 which is different than the first direction 17, and a pitch mechanism 3 coupled to the first portion 4 and the second portion 5 of the set of movable foils and configured to control a pitch angle of the first portion 4 and the second portion 5 of the set of movable foils.

The device is configured to perform the motion of the first portion 4 of the set of foils in another propulsor plane than the motion of the second portion 5 of the set of foils. The term "propulsor plane" is directed to a geometrical plane. The first portion 4 of the set of foils, i.e. the fore portion of the set of foils, is capable of moving in a first plane and the second portion 5 of the set of foils, i.e. the aft portion of the set of foils, is capable of moving in a second plane. The first plane and the second plane are arranged parallel to each other. The first direction 17 of the first portion 4 of the set of foils is opposite to the second direction 18 of the second portion 4 of the set of foils. The motion of at least a part of the first portion 4 of the set of foils in the first direction 17 and the second portion 5 of the set of foils in the second direction 18 is along a straight line, for instance. The movement mechanism 2 may include a plurality of wheels 15 in order to provide the capability of changing the direction of a respective foil 4, 5. The movement mechanism 2 may be driven by an engine. For example, a diesel engine may be coupled via a gear to at least one wheel 15 of the movement mechanism 2 in order to move the set of foils along the closed first trajectory 6.

The pitch angle 7C of the first portion 4 of the set of foils may be constant during movement of the first portion 4 of the set of foils in the first direction. The pitch angle 7C of the second portion 5 of the set of foils may be constant during movement of the second portion 5 of the set of foils in the second direction. In other cases, the pitch angle 7C of the first portion 4 of the set of foils may vary during movement of the first portion 4 of the set of foils in the first direction. Additionally, the pitch angle 7C of the second portion 5 of the set of foils may vary during movement of the second portion 5 of the set of foils in the second direction.

According to the shown embodiment, the actual implementation of the foil motions is achieved by using two conveyors 10, 11. For example, each conveyor may be an endless chain or an endless belt. The movement mechanism 2 comprises a first conveyor 2. The first conveyor 10 of the movement mechanism 2 may be coupled to the leading edges 8 of the foils 4, 5. In particular, the first conveyor 10 may be coupled to each foil 4, 5 at a distance in the range between 0%-35% of the chord length from the leading edge 8 of the respective foil 4. For example, in case that each foil 4, 5 is arranged at a distance of about 25% of the chord length from the leading edge 8 of the respective foil 4, the foils can be considered as well balanced, thus reducing the moment acting on the coupling. In FIG. 1 the pivot point 14 is shown at a distance of about 25% of the chord length from the leading edge 8 of the respective foil 4.

Said first conveyor 10 acts as the power conveyor of the movement mechanism 2 and is capable of simultaneously moving the first portion 4 and the second portion 5 of the set of foils along a first closed trajectory 6. The pitch mechanism 3 comprises a second conveyor 11. The second conveyor 11 is coupled to the trailing edges 9 of the foils 4, 5 and may be either fixed to them or act as a driving slit along which the foil trailing edges 9 may slide. The second conveyor 11 acts as the guiding conveyor and is capable of steering the location of the trailing edges 9 of the foils 4, 5. The second conveyor 11 either moves along a closed second trajectory 7 or is a fixed driving slit for the trailing edges 9 of the foils 4, 5. The first conveyor 10 and the second conveyor 11 are at least partially displaced axially, i.e. in the x-direction, to each other.

According to the shown embodiment, the pitch angle 7C of the first portion 4 of the set of foils may be controlled by adjusting the distance between the first conveyor 10 coupled to the leading edge 8 of the first portion 4 of the set of foils and the second conveyor 11 coupled to the trailing edge 9 of the first portion 4 of the set of foils. Additionally, the pitch angle 7C of the second portion 5 of the set of foils may be controlled by adjusting the distance between the first conveyor 10 coupled to the leading edge 8 of the second portion 5 of the set of foils and the second conveyor 11 coupled to the trailing edge 9 of the second portion 5 of the set of foils. The pitch angle 7C of the first portion 4 of the set of foils and the pitch angle 7C of the second portion 5 of the set of foils may be adjusted independently by means of a forward pitch control 12 and an aft pitch control 13 in order to provide optimum angles of attack α for the respective foils 4, 5. The distance between the first conveyor 10 and the second conveyor 11 may be e.g. adjusted by sliding of first wheels 15 of the movement mechanism 2 relative to the second conveyor 11 or second wheels 16 of the pitch mechanism 3. Of course, the distance between the first conveyor 10 and the second conveyor 11 may also be e.g. adjusted by sliding of second wheels 16 of the pitch mechanism 3 relative to the first conveyor 10 or the first wheels 15 of the movement mechanism 2. In other words, optimum pitches 7C at varying speeds of a ship for the first portion 4 and the second portion 5 of the set of foils may be selected by controlling the axial distance between the conveyors 10, 11. The thrust T of the device 1 is dependent on the sum of the horizontal portions of the lift forces created by the foils 4, 5.

According to certain embodiments, the foils 4, 5 are assumed to move in a substantially vertical direction, thus working as wings of high aspect ratio. In this case the aspect ratio is limited by the breadth of the ship. A high aspect ratio is desirable from the standpoint of foil efficiency. The foils 4, 5 are typically identical. The footprint of each foil may be e.g. rectangular, a half of an ellipse, or the foil may be tapered from the center towards both ends. The cross section of each foil may be symmetrical or asymmetrical.

The mechanical structure of the system may be further at least partially supported by a frame (not shown) which at least partially surrounds the foils 4, 5 and acts as an end plate for the foils. In accordance with foil theory, such end plates improve efficiency of the foils 4, 5. The frame may also be configured to homogenize or orientate the direction of the incoming fluid flow $v_x$. The frame may also be configured to locally increase the velocity of the incoming fluid flow $v_x$. Alternatively, the foils 4, 5 may be equipped with so called winglets in order to improve efficiency.

According to certain embodiments, at least one of the foils of the set of movable foils is at least partially flexible. In other words, at least a part of one of the foils is able to substantially deform under the over-pressure acting on their pressure side. The term "flexible" means that a deformation of at least a part of the foil is greater than 1% of the chord. The deformation of at least a part of the foil may be 3%, 5%, or 10% of the chord, for instance. According to certain embodiments, at least a portion of the rear part of at least one foil of the set of movable foils is flexible. Thus, efficiency can be further improved, because a force vector is more in-line with the direction of advance.

According to certain embodiments, the foils 4, 5 are able to deform under the over-pressure acting on their pressure side, reaching a maximum camber at about 30% of the chord from the leading edge 8. This can be achieved by a proper selection of the material properties of the foil 4, 5 by using composite materials.

Figure 2:
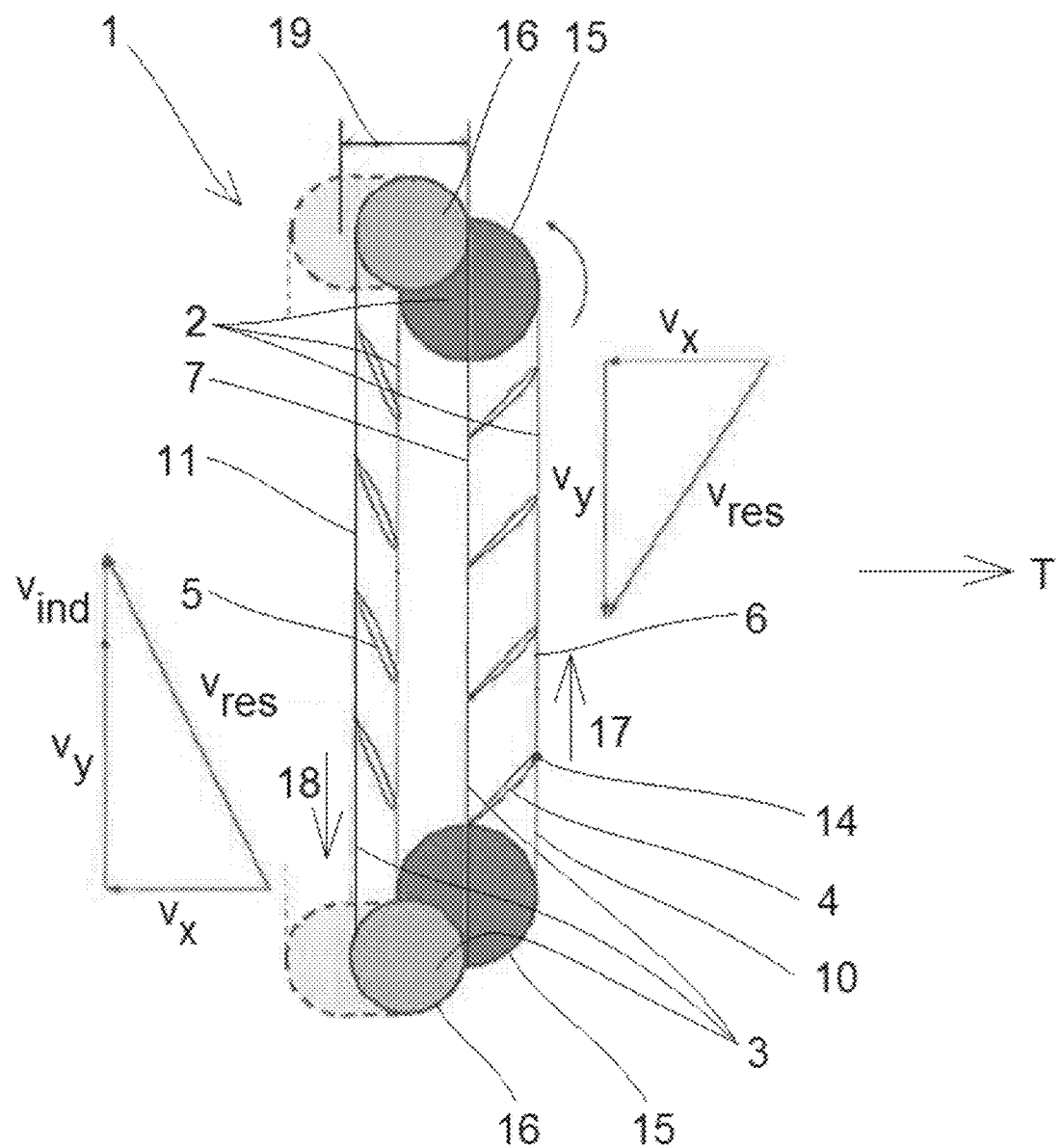
FIG. 2 illustrates a schematic view of another energy transforming device configured to propel a vessel in accordance with at least some embodiments of the present invention.

In FIG. 2 a schematic view of another energy transforming device 1 configured to propel a vessel in accordance with at least some embodiments of the present invention is illustrated. The marine propulsion system comprises a first portion 4 and a second portion 5 of a set of movable foils 15, a movement mechanism 2 coupled to the first portion 4 and the second portion 5 of the set of movable foils 15 and configured to simultaneously control a motion of the first portion 4 and the second portion 5 of the set of foils 15 along a closed first trajectory 6 comprising a first direction 17 and a second direction 18 which is different than the first direction 17, and a pitch mechanism 3 coupled to the first portion 4 and the second portion 5 of the set of movable foils 15 and configured to control a pitch angle of the first portion 4 and the second portion 5 of the set of movable foils 15. The device is configured to perform the motion of the first portion 4 of the set of foils in another plane than the motion of the second portion 5 of the set of foils. The first direction 17 of the first portion 4 of the set of foils is opposite to the second direction 18 of the second portion 4 of the set of foils. The motion of at least a part of the first portion 4 of the set of foils in the first direction 17 and the second portion 5 of the set of foils in the second direction 18 is along a straight line, for instance.

According to the shown embodiment, the marine propulsion system comprises a set of foils following paths similar to those of a bicycle chain. The first conveyor 10 is located perpendicular to the main axial inflow $v_x$. For a person skilled in the art, it is clear that the term "perpendicular" does not mean "mathematically perpendicular" in this context. Of course, the direction of the water inflow under the hull of a ship may vary for different reasons. The orientation of the first conveyor 10 as well as the first and second direction can be understood as "substantially perpendicular".

The first conveyor 10 is capable of moving around the wheels 15 of the movement mechanism 2. At least one of the wheels 15 of the movement mechanism 2 is coupled to an engine in order to drive the conveyor 10. The pitch mechanism 3 comprises a second conveyor 11 capable of moving along a closed second trajectory 7. The second conveyor 11 is capable of moving around the wheels 16 of the pitch mechanism 3. The first portion 4 of the set of foils on the fore part of the first conveyor 10 have an optimum pitch adjusted to the relative angle of attack α resulting from the combination of the main inflow $v_x$ and the perpendicular motion of the first conveyor 10. The second portion 5 of the set of foils on the aft part of the first conveyor 10 have a different optimum pitch resulting from the combination not only of the inflow $v_x$ and the flow $v_y$ created by the local motion of the second portion 5 of the set of foils but also of the flow $v_{ind}$ induced by the first portion 4 of the set of foils. In other words, a pitch angle of at least a part of the second portion 5 of the set of foils is dependent on an incoming fluid flow $v_x$, the motion $v_y$ of the second portion 5 of the set of foils, and a flow $v_{ind}$ induced by at least a part of the first portion 4 of the set of foils. The motion of the first portion 4 of the set of foils in the first direction 17 influences the pitch angle π of the second portion 5 of the set of foils simultaneously performing the motion in the second direction 18.

The first conveyor 10 does not have to be an endless chain, but can be instead also constructed as a rigid driving mechanism connected to the tips of the foils, for instance. Also the second conveyor 11 does not have to be an endless chain. The pitch angle π of the foils 4, 5 may be for example also adjusted by servo motors or any other means capable of adjusting the pitch angle π of the foils 4, 5. The pitch mechanism 3 may be configured to simultaneously or independently control the pitch angle of the first portion 4 and the second portion 5 of the set of movable foils. The pitch mechanism 3 may also be configured to independently control the pitch angle of each of the foils 4, 5 of the set of movable foils.

The device 1 can be arranged under the hull of a vessel in a substantially vertical direction or in a substantially horizontal direction substantially perpendicular to the incoming axial fluid flow $v_x$.

In case that the foils 4, 5 are configured to move to the starboard side and port side of a ship, i.e. in horizontal direction, the aspect ratio of the foils is limited by the draught of the ship. The device 1 may be configured to permit sliding of the wheels 16 of the pitch mechanism 3. Sliding of the wheels 16 of the pitch mechanism 3 relative to the wheels 15 of the movement mechanism, resulting in changing of a variable distance 19 between the fore portion of the first conveyor 10 and the fore portion of the second conveyor 11 as well as between the aft portion of the first conveyor 10 and the aft portion of the second conveyor 11, can be e.g. utilized for ship maneuvering, because a variation of the distance 19 leads to different pitch angles π of the first portion 4 and the second portion 5 of the set of movable foils. Non-symmetric forces in the transverse direction may be obtained depending on the pitch angles π of the first portion 4 and the second portion 5 of the set of movable foils in order to maneuver the ship.

Changing of the variable distance 19 results in different pitch angles π of the first portion 4 and the second portion 5 of the set of movable foils. Sliding of the wheels 16 of the pitch mechanism 3, i.e. changing of the variable distance 19 between the fore portion of the first conveyor 10 and the fore portion of the second conveyor 11 as well as between the aft portion of the first conveyor 10 and the aft portion of the second conveyor 11, can also be utilized for optimization of the angle of attack α at different ship speeds and/or for acceleration of the ship. Changing the pitch angle $\pi$ may be e.g. useful during acceleration of the ship, because the velocity of the incoming fluid flow $v_x$ increases during acceleration, thus also changing the velocity and orientation of the resulting fluid flow $v_{res}$. The pitch mechanism 3 is designed to permanently achieve an optimum or almost optimum angle of attack $\alpha$ of the foils 4, 5 by means of adjusting the pitch angle $\pi$ of the first portion 4 and the second portion 5 of the set of movable foils in relation to the temporarily resulting fluid flow $v_{res}$.

In FIG. 2 also a first velocity diagram for the first (fore) portion 4 of the set of foils and a second velocity diagram for the second (aft) portion 5 of the set of foils is illustrated.

The first velocity diagram shows the velocity and direction of the incoming axial main flow $v_x$, the velocity and direction of the flow $v_y$ created by the local motion of the first portion 4 of the set of foils, and the velocity and direction of the resulting local flow $v_{res}$. The lift force, the drag force, and the thrust of each foil of the first portion 4 of foils are dependent on the velocity of the resulting local flow $v_{res}$ as well as on the angle of attack $\alpha$ between the direction of the resulting local flow $v_{res}$ and the orientation of the chord line of the foil.

The second velocity diagram shows the velocity and direction of the incoming axial main flow $v_x$, the velocity and direction of the flow $v_y$ created by the local motion of the second portion 5 of the set of foils, the velocity and direction of the flow induced by the first (fore) portion 4 of the set of foils $v_{ind}$, and the velocity and direction of the resulting local flow $v_{res}$. The lift force, the drag force, and the thrust of each foil of the second portion 5 of foils are dependent on the velocity of the resulting local flow $v_{res}$ as well as on the angle of attack $\alpha$ between the direction of the resulting local flow $v_{res}$ and the orientation of the chord line of the foil.

Figure 3:
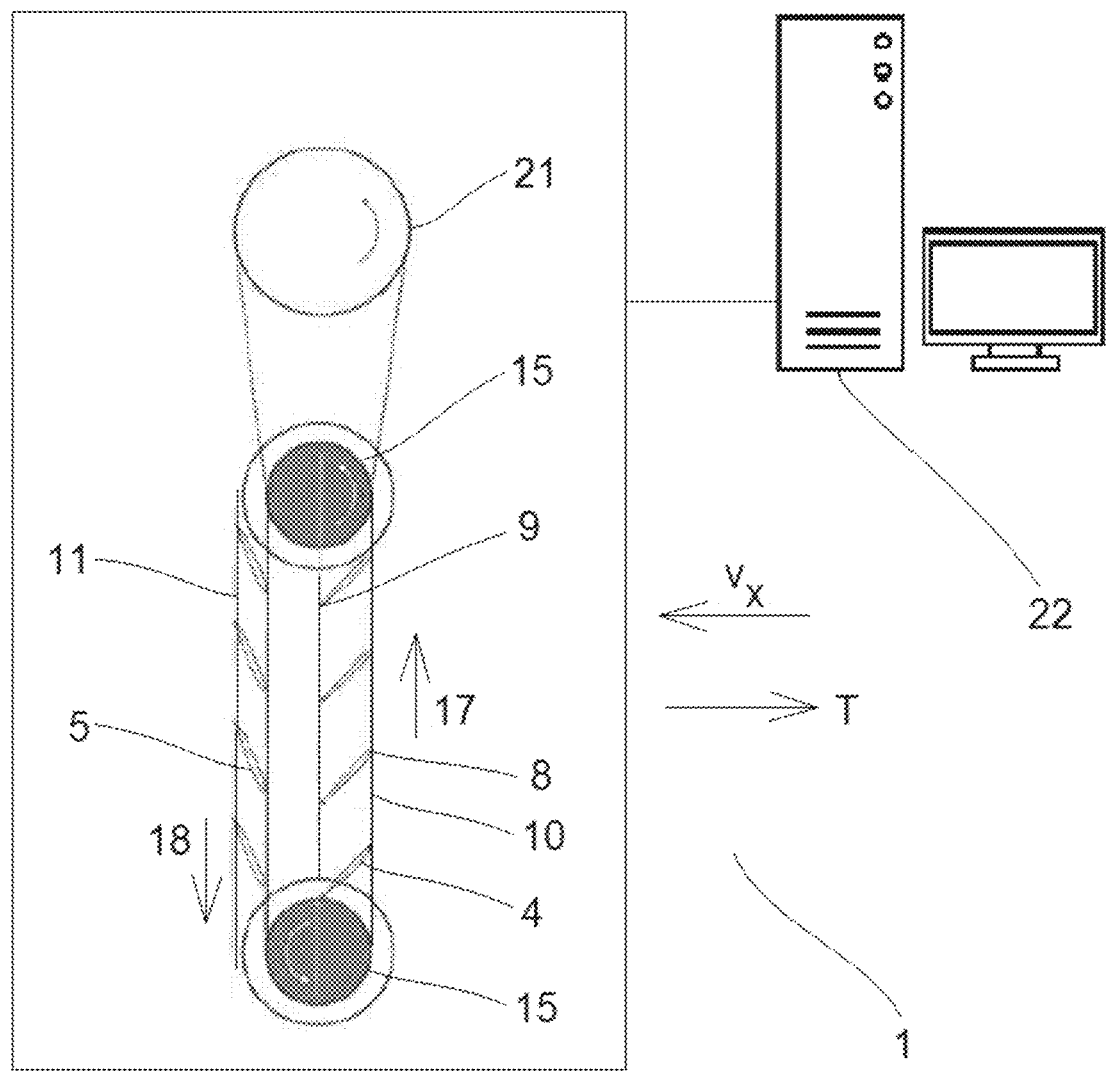
FIG. 3 illustrates a schematic view of yet another energy transforming device configured to propel a vessel in accordance with at least some embodiments of the present invention.

In FIG. 3 a schematic view of yet another energy transforming device 1 configured to propel a vessel in accordance with at least some embodiments of the present invention is illustrated. The general working principle of the marine propulsion system is as described above with reference to FIG. 1 and FIG. 2. The leading edges 8 of the first portion 4 and the second portion 5 of the set of foils are coupled to the first conveyor 10 which acts as the power conveyor. The trailing edges 9 of the first portion 4 and the second portion 5 of the set of foils are coupled to the second conveyor 11. At least one wheel 15 of the movement mechanism 2 is coupled to an engine wheel 21 in order to drive the respective wheel 15 of the power conveyor, thus also moving the power conveyor and the foils 4, 5. The engine wheel 21 may be located inside the hull of the ship or above sea level on the deck of the ship.

According to the shown embodiment, the marine propulsion system comprises a computing device 22 and a computer readable medium having stored thereon a set of computer implementable instructions capable of causing the computing device 22, in connection with the first portion 4 and the second portion 5 of a set of movable foils, the movement mechanism 2, and the pitch mechanism 3 to create thrust T by means of driving the foils 4, 5 along the first trajectory 6 utilizing the movement mechanism 2.

According to a certain embodiment, the device is configured to harvest energy from an incoming fluid flow, preferably a liquid flow, and especially a water flow. In this case, thrust T is not created, but the device acts as a turbine. The kinetic energy of the incoming fluid flow $v_x$ causes the movement mechanism 2 to move. Consequently, said kinetic energy can be transferred to a generator. In this case, the turbine may comprise a computing device 22 and a computer readable medium having stored thereon a set of computer implementable instructions capable of causing the computing device 22, in connection with the first portion 4 and the second portion 5 of a set of movable foils, the movement mechanism 2, and the pitch mechanism 3 to transfer kinetic energy from the incoming fluid flow $v_x$ to a generator by means of guiding the foils 4, 5 along the first trajectory 6 utilizing the movement mechanism 2.

Regardless whether the device acts as a propulsor or a turbine, the pitch angle $\pi$ of the second portion 5 of the set of foils may be controlled by means of an aft pitch control and the computing device 22 dependent on the incoming fluid flow $v_x$, the motion of the second portion 5 of the set of foils, and a flow $v_{ind}$ induced by at least a part of the first portion 4 of the set of foils. Of course, the pitch angle $\pi$ of the first portion 4 of the set of foils may be controlled by means of a fore pitch control and the computing device 22 dependent on the incoming fluid flow $v_x$ and the motion of the second portion 5 of the set of foils.

The device 1 may include at least one sensor for measuring at least one of a local fluid flow velocity and a local fluid flow direction. The sensor may be useful to receive input data for controlling the pitch angle $\pi$ of the first portion 4 and the second portion 5 of the set of foils. The sensor may also be useful to receive input data for controlling the velocity of the motion of the foils along the first trajectory 6.

Figure 4:
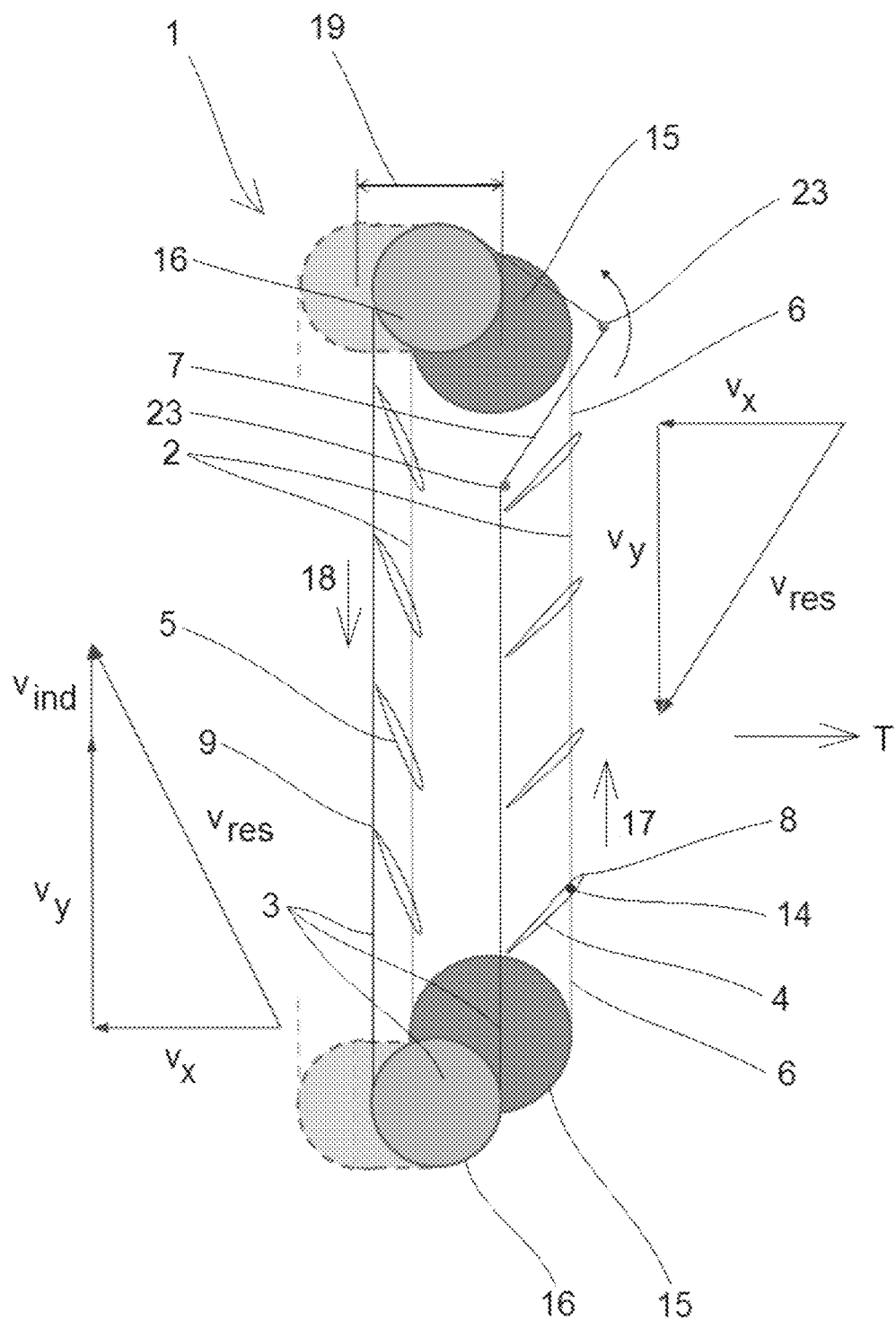
FIG. 4 illustrates a schematic view of a yet further energy transforming device configured to propel a vessel in accordance with at least some embodiments of the present invention.

In FIG. 4 a schematic view of a yet further energy transforming device 1 configured to propel a vessel in accordance with at least some embodiments of the present invention is illustrated. In addition to the features presented in FIG. 2, the second trajectory 7 includes two further turning points 23 in the upper region of the device 1. Turning of a foil is possible when two points of a foil near the leading edge 8 and the trailing edge 9 move along the first trajectory 6 and the second trajectory 7, respectively.

Sliding of the wheels 16 of the pitch mechanism 3 relative to the wheels 15 of the movement mechanism 2, resulting in changing of a variable distance 19 between the fore portion of the first conveyor 10 and the fore portion of the second conveyor 11 as well as between the aft portion of the first conveyor 10 and the aft portion of the second conveyor 11, can be utilized for optimization of the angle of attack $\alpha$ at different ship speeds and/or for acceleration of the ship. In other words, the distance between the first conveyor 10 and the second conveyor 11 can be varied, thus resulting in a variation of the pitch angle $\pi$ of the first portion 4 and the second portion 5 of the set of movable foils.

Figure 5:
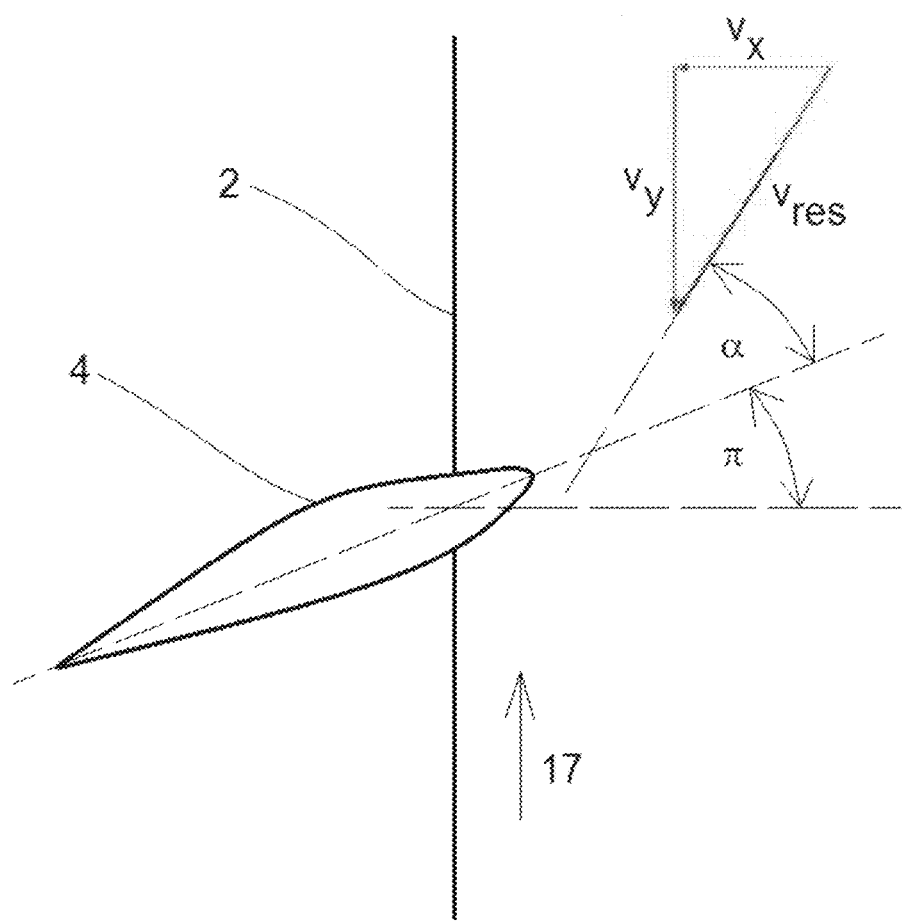
FIG. 5 illustrates a schematic view of a foil of an energy transforming device in accordance with at least some embodiments of the present invention.

In FIG. 5 a schematic view of a foil of an energy transforming device in accordance with at least some embodiments of the present invention is illustrated. In this document, a foil is defined as a body creating a lift force and a drag force due to an incoming fluid flow. Examples of such foils are so called NACA foils. A pitch angle $\pi$ or pitch is defined as 90° minus the angle between the chord line of a foil and the moving direction of the foil, i.e. the first direction 17 or the second direction 18, respectively. In other words, a zero pitch angle is perpendicular to a first direction 17 and/or second direction 18. Further, an angle of attack $\alpha$ is defined in this document as an angle between the direction of a resulting local flow $v_{res}$ and a chord line of a foil. Additionally, in this document a foil is a member of the first portion 4 of the set of foils as long as it moves in the first direction 17 or is located on the part of the first trajectory 6 pointing in the first direction 17. In this document a foil is a member of the second portion 5 of the set of foils as long as it moves in the second direction 18 or is located on the part of the first trajectory 6 pointing in the second direction 18. Furthermore, in this document an incoming fluid flow will first interact with the first portion of the set of foils and then interact with the second portion of the set of foils. A fluid flow can pass two consecutive foils of the fore portion and the aft portion of the set of movable foils.

An embodiment of the present invention is directed to a marine propulsion system comprising efficient NACA profiles with a rounded leading edge and a sharp trailing edge, since the motion mechanism allows to have the leading edge always located towards the direction of the incoming flow. This is especially important in marine applications where low drag and cavitation avoidance are key matters for high propulsor performance.

Figure 6:
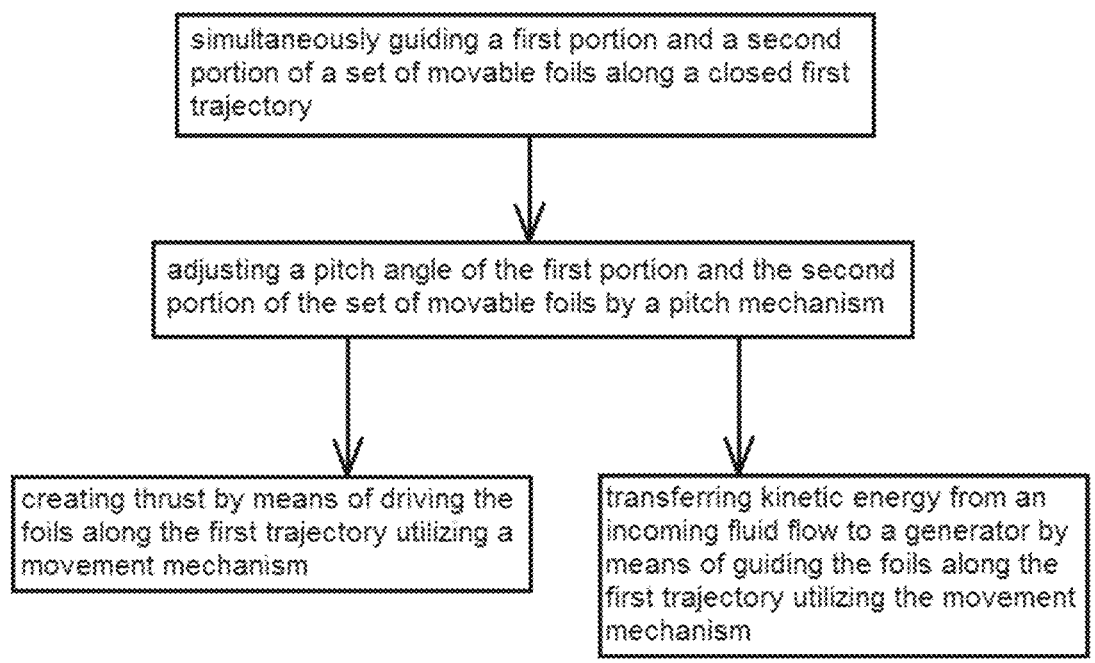
FIG. 6 illustrates a flow chart of a method of transforming energy in accordance with at least some embodiments of the present invention.

In FIG. 6 a flow chart of a method of transforming energy in accordance with at least some embodiments of the present invention is illustrated. The method of transforming energy comprises simultaneously guiding a first portion 4 and a second portion 5 of a set of movable foils along a closed first trajectory 6 comprising a first direction 17 and a second direction 18 which is different than the first direction 17, and adjusting a pitch angle $\pi$ of the first portion 4 and the second portion 5 of the set of movable foils by a pitch mechanism 3. As a first alternative the method further comprises creating thrust T by means of driving the foils 4, 5 along the first trajectory 6 utilizing a movement mechanism 2. As a second alternative the method further comprises transferring kinetic energy from an incoming fluid flow $v_x$ to a generator by means of guiding the foils 4, 5 along the first trajectory 6 utilizing the movement mechanism 2. In other words, the method of transforming energy is either directed to propulsion of a vessel or to harvesting energy.

According to a certain embodiment, the pitch angle $\pi$ of the first portion 4 of the set of foils is constant during guiding of the set of foils along the first trajectory and the pitch angle $\pi$ of the second set of foils is constant during guiding of the set of foils along the first trajectory. Typically, the pitch angle $\pi$ of the first portion 4 of the set of foils and the pitch angle $\pi$ of the second set of foils are different, because the pitch angle $\pi$ of at least a part of the first portion 4 of the set of foils is dependent on an incoming fluid flow $v_x$ and the motion of the first portion 4 of the set of foils, and the pitch angle $\pi$ of at least a part of the second portion 5 of the set of foils is dependent on an incoming fluid flow $v_x$, the motion of the second portion 5 of the set of foils, and a flow $v_{ind}$ induced by at least a part of the first portion 4 of the set of foils.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in propulsion of ships or in harvesting energy from an incoming fluid flow.

REFERENCE SIGNS LIST 1 energy transforming device
2 movement mechanism
3 pitch mechanism
4 first portion of set of movable foils
5 second portion of set of movable foils
6 first trajectory
7 second trajectory
8 leading edge of foil
9 trailing edge of foil
10 first conveyor
11 second conveyor
12 fore pitch control
13 aft pitch control
14 pivot point
15 wheel of movement mechanism
16 wheel of pitch mechanism
17 first direction 18 second direction
19 variable distance for ship maneuvering, optimization of angle of attack at different ship speeds and/or acceleration
21 engine wheel
22 computing device
23 turning point
T thrust
$v_{ind}$ flow induced by first portion of set of foils
$v_{res}$ resulting local flow
$v_x$ incoming fluid flow
$v_y$ flow created by movement mechanism
$\alpha$ angle of attack
$\pi$ pitch angle

CITATION LIST

Patent Literature
WO 2011/115475 A2
U.S. Pat. No. 5,401,196
US 2015/0321740 A1
DE 4238394 A1
FR 2697225 A1
DE 3640285 A
Non Patent Literature

The invention claimed is:

1. A marine propulsion system comprising:
a first portion and a second portion of a set of movable foils,
a movement mechanism comprising a first conveyor coupled to the first portion and the second portion of the set of movable foils and configured to simultaneously control a motion of the first portion and the second portion of the set of foils around a first plurality of wheels along a closed first trajectory comprising a first direction and a second direction which is different than the first direction, and
a pitch mechanism coupled to the first portion and the second portion of the set of movable foils and configured to control a pitch angle of the first portion and the second portion of the set of movable foils, the pitch mechanism comprising a second conveyor coupled to the first portion and the second portion of the set of movable foils, wherein the second conveyor is configured to move around a second plurality of wheels,
wherein the system is configured to control the pitch angle of at least a part of the second portion of the set of foils based on an incoming fluid flow, the motion of the second portion of the set of foils, and a flow induced by at least a part of the first portion of the set of foils, and wherein the pitch angle of the first portion of the set of foils and the pitch angle of the second portion of the set of foils is controllable by adjusting a distance between the first conveyor and the second conveyor by sliding the first plurality of wheels relative to the second plurality of wheels or by sliding the second plurality of wheels relative to the first plurality of wheels.

2. The marine propulsion system according to claim 1, wherein the movement mechanism is configured to control a velocity of the motion of the first portion and the second portion of the set of movable foils.

3. The marine propulsion system according to claim 1, wherein the first direction of the first portion of the set of foils is opposite to the second direction of the second portion of the set of foils.

4. The marine propulsion system according to claim 1, wherein the movement mechanism comprises a first conveyor capable of moving along the first trajectory.

5. The marine propulsion system according to claim 4, wherein the first conveyor is coupled to the foils at a distance in the range between 0%-35% of the chord length of the respective foil from a leading edge of the foil.

6. The marine propulsion system according to claim 1, wherein the pitch mechanism comprises a second conveyor capable of moving along a closed second trajectory.

7. The marine propulsion system according to claim 1, wherein the system comprises a fore pitch control configured to adjust the pitch angle of the first portion of the set of foils and an aft pitch control configured to adjust the pitch angle of the second portion of the set of foils.

8. The marine propulsion system according to claim 1, wherein the system includes at least one sensor for measuring at least one of a local fluid flow velocity and a local fluid flow direction.

9. The marine propulsion system according to claim 1, wherein the system is configured to steer a vessel.

10. The marine propulsion system according to claim 1, wherein at least one of the foils of the set of movable foils is at least partially flexible.

11. A method of propelling a vessel, the method comprising:
simultaneously guiding a first portion and a second portion of a set of movable foils by a first conveyor around a first plurality of wheels along a closed first trajectory comprising a first direction and a second direction which is different than the first direction,
controlling a pitch angle of the first portion and the second portion of the set of movable foils by a pitch mechanism comprising a second conveyor coupled to the first portion and the second portion of the set of movable foils, wherein the second conveyor is configured to move around a second plurality of wheels, wherein controlling the pitch angle of the first portion of the set of foils and the pitch angle of the second portion of the set of foils takes place by adjusting a distance between the first conveyor and the second conveyor by sliding the first plurality of wheels relative to the second plurality of wheels or by sliding the second plurality of wheels relative to the first plurality of wheels, and
wherein the pitch angle of at least a part of the second portion of the set of foils is controlled based on the incoming fluid flow, the motion of the second portion of the set of foils, and a flow induced by at least a part of the first portion of the set of foils.

12. The method according to claim 11, wherein a velocity of the motion of the first portion and the second portion of the set of movable foils is controlled.

13. The method according to claim 11, wherein the first direction of the first portion of the set of foils is opposite to the second direction of the second portion of the set of foils.

14. The method according to claim 11, wherein at least a part of the first portion and/or the second portion of the set of foils is moved along a straight line or along an elongated curve, wherein a length of a transverse part of the curve is less than 10% of a length of a longitudinal part of the curve.

15. The method according to claim 11, wherein energy is transferred in order to steer a vessel.

* * * * *